United States Patent [19]

Fasching et al.

[11] 3,775,215

[45] Nov. 27, 1973

[54] METHOD OF THIN COATING A MEMORY STACK

[75] Inventors: Herman J. Fasching, Minneapolis; John A. Kasel, St. Paul, both of Minn.

[73] Assignee: Sperry Rand Corporation, New York, N.Y.

[22] Filed: Dec. 22, 1971

[21] Appl. No.: 210,880

[52] U.S. Cl. .......... 156/278, 117/119, 156/286, 340/174 R

[51] Int. Cl. .......... G11c 11/02

[58] Field of Search .......... 156/278, 285, 286; 117/61, 119, 201, 234; 340/174 M; 29/604

[56] References Cited

UNITED STATES PATENTS

| | | | |
|---|---|---|---|
| 2,364,713 | 12/1944 | Hensel | 117/119 |
| 1,343,842 | 6/1920 | Piersol | 117/119 |
| 3,279,945 | 10/1966 | Haives et al. | 340/174 R |
| 2,494,920 | 1/1950 | Warrick | 117/119 |
| 3,392,053 | 7/1968 | Olson et al. | 340/174 R |
| 3,447,975 | 6/1969 | Bilo et al. | 117/119 |

OTHER PUBLICATIONS

IBM Technical Disclosure Bulletin, Vol. 4, No. 1, June 1961, page 52

*Primary Examiner*—Alfred L. Leavitt
*Assistant Examiner*—Caleb Weston
*Attorney*—Kenneth T. Grace et al.

[57] ABSTRACT

A method of thin coating a plurality of two-dimensional memory planes while assembled in a three-dimensional memory stack is disclosed. The memory stack is soaked in the coating liquid under vacuum and is then baked to set the coating liquid into a wax-like plastic solid conformal coating. This operation fixes the cores, wires, etc. in place and avoids magnetostrictive effects.

4 Claims, 2 Drawing Figures

METHOD OF THIN COATING A MEMORY STACK

BACKGROUND OF THE INVENTION

The present invention relates to electronic data processing and in particular to a method of assembling the two-dimensional memory core planes as used therein. Because toroidal magnetizable memory cores are generally subject to magnetostrictive effects, which effects degrade their performance as reliable memory devices, many prior art techniques have been utilized to prevent movement of or stress upon the cores within the two-dimensional memory planes. In the past mats of polyurethane have been inserted between the memory planes of the stack to reduce movement of the cores due to environmental conditions of temperature, shock and vibration. Additionally, the individual two-dimensional memory planes have been sprayed or brushed with a coating material which was then dried to fix the cores in place. However, such methods have not produced the desired results. As with the spraying or brushing of a coating material upon the individual memory planes, the coating material was found to concentrate in certain local areas and upon drying to produce localized stress upon the so-affected memory cores. Additionally, local areas could build up to such an extent so as to produce stress upon the memory cores when the memory planes were later assembled into a memory stack.

SUMMARY OF THE INVENTION

The present invention overcomes the problems of prior art techniques and ensures the assembly of three-dimensional memory stacks of negligible magnetostrictive effects. The method of the present invention involves: assembling a plurality of two-dimensional memory core planes into a three-dimensional memory stack; immersing the memory stack in a container of liquid coating material while under a vacuum; removing the memory stack from the container and vacuum and draining off any excess coating material and, baking the coated memory stack to remove the solvents and setting the coating material for fixing cores, wires, etc. in place.

DESCRIPTION OF THE PREFERRED EMBODIMENT

Figures 1, 2:
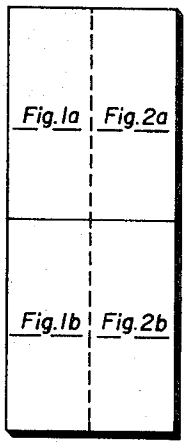
FIG. 1 is a flow diagram illustrating a typical series of steps that may be followed in preparing a memory stack in accordance with the preferred technique of the present invention.
FIG. 2 is a series of views illustrating the steps of the method of the present invention during the associated steps in accordance with the technique of FIG. 1, the various figures illustrating each production step progressively at various stages of the present method and corresponding to the steps that are indicated adjacently in the flow diagram of FIG. 1.
Figure 1A:
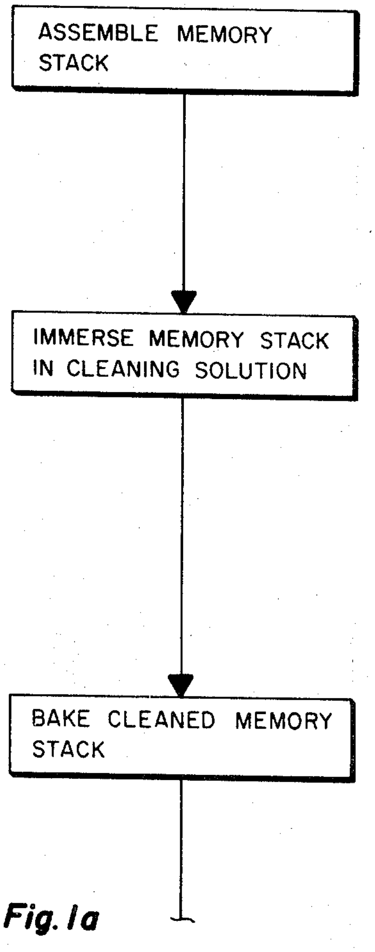
Figure 2A:
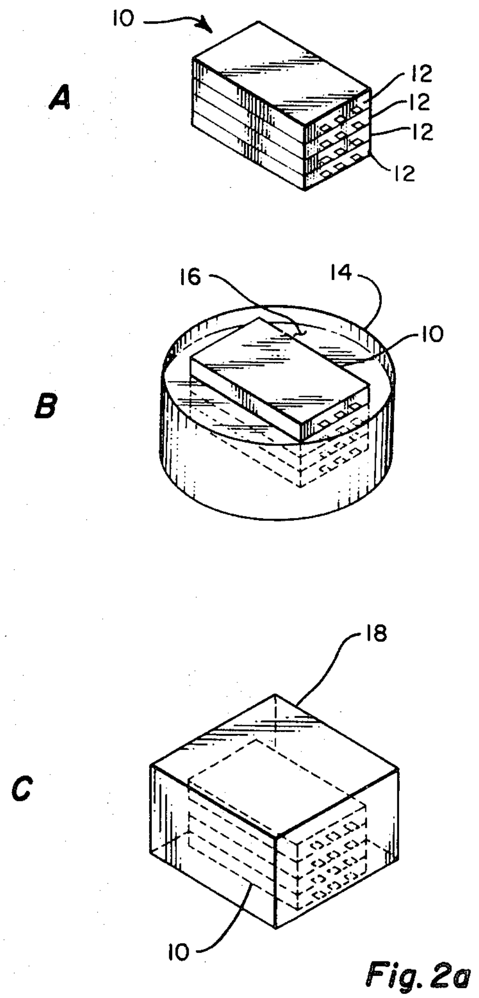
Figure 1B:
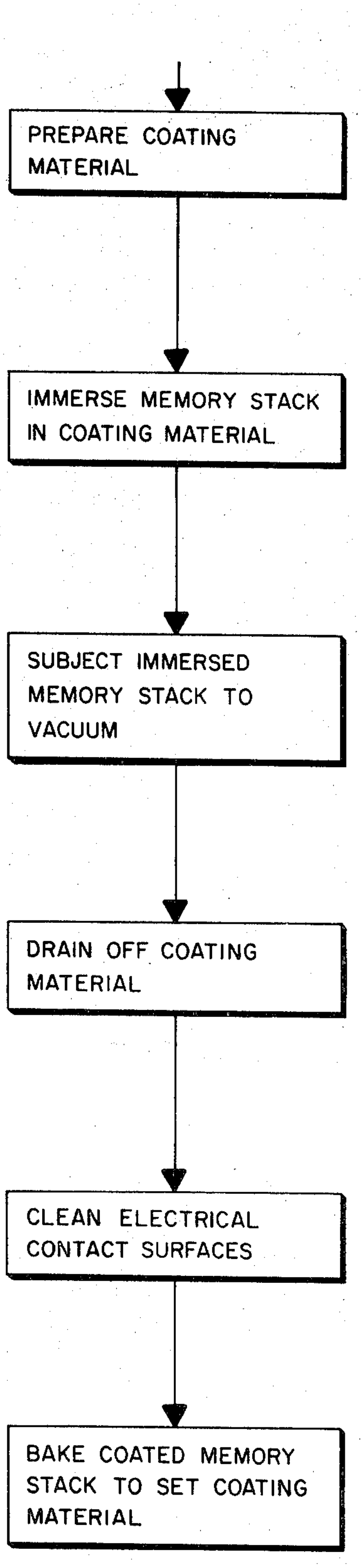
Figure 2B:
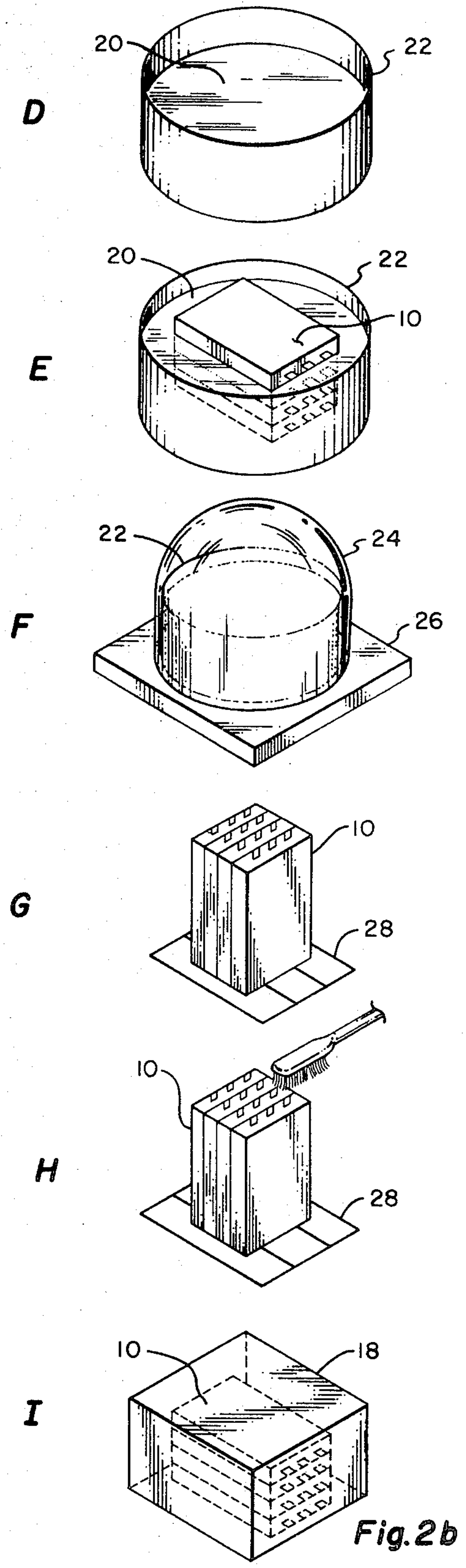

Discussion of an exemplary method of practicing the present invention shall proceed with reference to FIGS. 1 and 2. FIG. 1 illustrates a flow diagram of a series of steps that may be followed in preparing a three-dimensional memory stack, comprised of a plurality of two-dimensional memory core arrays, in accordance with the preferred technique of the present invention. FIG. 2 illustrates progressively the steps of the method of the present invention during various stages of its practice. Each of the illustrations of FIG. 2 is located adjacent to the step during which it is practiced as seen in the flow chart of FIG. 1. The method of the present invention is practiced in the following exemplary steps:

A. Initially, the three-dimensional memory stack 10 is assembled by stacking, superposed, a plurality of two-dimensional memory core planes 12 forming an integral assembly by suitable hardware. Such memory plane 12 may be of any of various well-known arrangements such as those of the following patents: J. W. Swenson U.S. Pat. No. 3,589,002; E. L. Robey, Jr. et al. U.S. Pat. No. 3,328,781; R. J. Dadamo et al. U.S. Pat. No. 3,210,745; L. Crown et al. U.S. Pat. No. 3,139,610. Such memory planes are generally comprised of a plurality of coplanar sets of parallel X drive lines and parallel Y drive lines, orthogonally arranged with a toroidal magnetizable core suspended by each X, Y drive line intersection. As these suspended cores and their suspending X, Y drive lines are not fixed in space, changing environmental conditions, e.g., temperature, shock, vibration, induce degraded operating characteristics thereto due to the magnetostrictive characteristics of the cores as magnetizable memory elements. Accordingly, the present invention is intended to substantially fix such cores in space by applying a thin conformal coating thereto which coating is uniformly applied to the entire two-dimensional memory plane while assembled in a three-dimensional memory stack. Such conformal coating permits the subsequent disassembly of the three-dimensional memory stack for maintenance purposes.

B. The next step in the present method involves cleaning memory stack 10 by immersing in a suitable container 14 of a suitable solvent 16 such as Freon T-P-35 purchased from E. I. DuPont de Nemours & Co. Inc., Freon Products Division, Wilmington, Del. 19898.

C. Next, the cleaned memory stack 10 is dried by baking in a suitable oven 18 for a sufficient time and at a sufficient temperature to properly remove the solvent, e.g., approximately 2 – 5 hours at a temperature of approximately 150° – 170° F.

D. The next step in the present method consists of preparing at ambient temperature a solution of the coating material 20 within a suitable container 22. Coating material 20 consists of a thoroughly mixed liquid solution of the following ingredients by weight:

1. Dow Corning 145 Fluid 5±2 percent (50 percent silicone polymers) Purchased from Dow Corning Corp., Midland, Mich. 48641
2. Heptane 95±2 percent Skellysolve C Purchased from Skelly Oil Co., Solvents Division, Kansas City, Mo. 64110

A sufficient quantity of coating material 20 is placed in container 22 to completely immerse the memory stack 10 when placed therein.

E. Next, memory stack 10, at ambient temperature, is placed in container 22 containing a sufficient quantity of coating material 20 to completely immerse memory stack 10 when placed therein.

F. Next, container 22, with coating material 20 and memory stack 10 immersed therein, is placed within an evacuatable enclosure. Such evacuatable enclosure may consist of a bell jar 24 upon a suitable supporting surface 26 all coupled to suitable evacuating means such as are well-known in the art. The vacuum within bell jar 24 is then drawn down to an absolute pressure of approximately 5 inches of mercury and maintained at such pressure for a sufficient period of time to permit the vacuum to withdraw any void-forming bubbles from coating material 20, e.g., approximately 30 seconds to 5 minutes. After such time the vacuum within bell jar 24 is allowed to return to ambient, i.e., room environment, conditions.

G. Next, memory stack 10 is removed from coating material 20 and container 22, placed upon a suitable rack 28 with the memory planes 12 oriented vertically and the excess coating material 20 is permitted to drain therefrom for approximately 2 – 15 minutes at ambient conditions.

H. Next, after memory stack 10 has cooled to ambient temperature any electrical contact surfaces are cleaned by removing the coating material 20 therefrom, e.g., by brushing such surfaces with a suitable solvent such as Freon T E purchased from E. I. DuPont de Nemours & Co. Inc., Freon Products Division, Wilmington, Del. 19898.

I. Next, the drained memory stack 10 is placed within a suitable oven 18 and baked at a temperature of approximately 150° Farenheit for approximately 6 hours to remove the solvents from the coating material 20, e.g., Heptane, and to set the coating material 20 into a wax-like plastic solid conformal coating that fixes the memory cores in memory plane 12 of memory stack 10 with respect to the supporting X, Y drive lines. After this baking period memory stack 10 is removed from oven 18 and permitted to cool at ambient conditions.

What is claimed is:

1. In a method of applying a conformal coating solution to the memory elements and associated drive lines of a three-dimensional memory stack that is formed of an integral assembly of a plurality of two-dimensional memory planes after which said conformal coating solution is set in a solid, plastic, conformal coating about said memory elements and associated drive lines, the improvement comprising:

immersing said memory stack in a container of said conformal coating solution; and then, subjecting said immersed memory stack while still immersed in said container of conformal coating solution to a vacuum environment for withdrawing any void-forming bubbles from said conformal coating solution.

2. A method of applying a conformal coating to the memory elements and associated drive lines of a three-dimensional memory stack, comprising the steps of:

A. assembling a plurality of two-dimensional memory planes into an integral, three-dimensional memory stack;

B. cleaning the memory stack of Step A;

C. immersing the cleaned memory stack of Step B in a container of a conformal coating solution;

D. subjecting the immersed memory stack of Step C while still immersed in said container of conformal coating solution to a vacuum environment for withdrawing void-forming bubbles from said conformal coating solution;

E. removing the immersed memory stack from said vacuum environment and said container of conformal coating solution of Step D;

F. draining any excess conformal coating solution from the memory stack of Step E while under ambient conditions; and, G. setting the conformal coating solution left on the drained memory stack of Step F into a solid, plastic conformal coating.

3. The method of claim 2 in which the memory stack of Step A is in Step B cleaned by immersing in a container of a cleaning solution and then dried by baking in an oven.

4. The method of claim 2 in which the drained memory stack of Step F has in Step G the coating solution set into a solid, plastic, conformal coating by baking in an oven.

* * * * *